No. 828,711. PATENTED AUG. 14, 1906.
C. MÖRZINGER CABOS.
MACHINE FOR MOLDING PASTRY AND CONFECTIONERY.
APPLICATION FILED OCT. 11, 1905.

WITNESSES: INVENTOR:
Fred White Christian Mörzinger Cabos,
Rene Bruine By his Attorneys
Arthur C. Fraser & Co.

THE NORRIS PETERS CO., WASHINGTON, D. C.

UNITED STATES PATENT OFFICE.

CHRISTIAN MÖRZINGER CABOS, OF VIENNA, AUSTRIA-HUNGARY.

MACHINE FOR MOLDING PASTRY AND CONFECTIONERY.

No. 828,711.            Specification of Letters Patent.            Patented Aug. 14, 1906.

Application filed October 11, 1905. Serial No. 282,266.

*To all whom it may concern:*

Be it known that I, CHRISTIAN MÖRZINGER CABOS, a subject of the Emperor of Austria-Hungary, residing at 27 Hernstorferstrasse XIII/4, Vienna, Austria-Hungary, have invented new and useful Improvements in Machines for Molding Pastry and Confectionery, of which the following is a specification.

This invention relates to machines for molding pastry and confectionery of the kind wherein dough is forced through orifices in the bottom of a container by means of a plate or plunger which fits tightly within the container, the said plate being then slightly raised, so as to produce a partial vacuum to stop the flow of the dough.

The invention has for its object to provide an improved construction and arrangement of mechanism for the operation of the plunger or pressure-plate of such machines.

According to the invention I make use of two levers operated by hand, one of the said levers acting upon a ratchet-wheel which is in the form of a nut and actuates a screw-spindle fitted on the pressure-plate, so as to depress the said plate on the rotation of the hand-lever to an extent corresponding to the delivery of a predetermined quantity of dough. The second lever has for its object to raise the plate after each expression of the dough in order to form the vacuum and at the same time to depress the table arranged below the bottom of the dough-container, so that the tray, which is placed upon the table and contains the pastry or confectionery, can be removed. By reversing the movement of the said second lever the pressure-plate is again depressed to the same extent, and the table is again raised to the bottom of the dough-container after having had placed upon it in the meantime a fresh tray.

Figure 1:
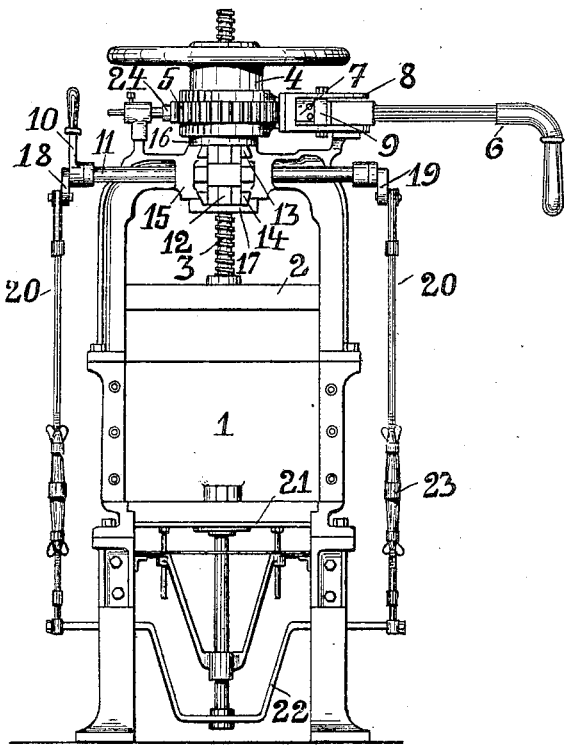
Figures 2, 3, 4, 5:
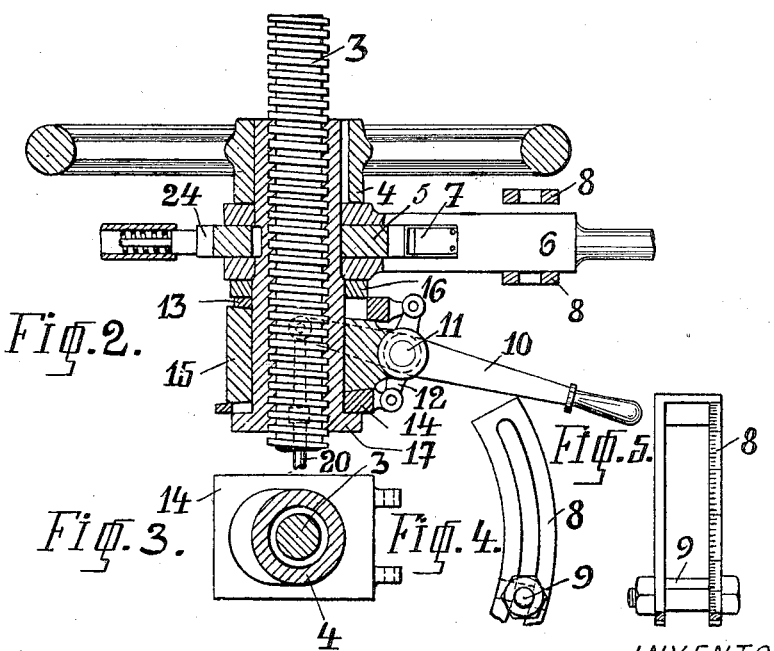

In the accompanying drawings, Figure 1 is a front view of a machine constructed according to the invention. Fig. 2 illustrates the arrangement of the lever for depressing the pressure-plate. Fig. 3 is a plan view of the lower slide, and Figs. 4 to 5 are views of details hereinafter described.

1 is the container for the dough, and 2 the pressure-plate, which fits snugly therein and which can be raised or lowered by means of the screw 3 and the hand-wheel 4, formed as a nut. (See Figs. 1 and 2.) In order that the pressure-plate 2 shall be depressed at each operation to a predetermined extent for delivering the dough, the nut which is provided on the hand-wheel 4 is furnished with ratchet-teeth 5, with which engages a pawl 7, attached to the hand-lever 6. The hand-lever moves in a curved guide, Figs. 4 and 5, which is graduated and provided with an adjustable stop 9 in order to limit the angle through which the lever 6 is turned, and thereby the extent of the movement of the pressure-plate 2, as desired.

In order that after each delivery of the dough a vacuum shall be produced in the usual way by raising the pressure-plate, I make use of the lever 10, which is secured to a shaft 11, Figs. 1 and 2. Upon this shaft there is keyed a two-armed lever 12, the ends of which are attached to two wedge-shaped slides 13 and 14, respectively. The surfaces of these slides are inclined in opposite directions, and the said slides work with the surfaces which are inclined toward one another upon two bearing-surfaces provided upon the upper part 15 of the machine-frame. Above and below the slides are arranged two collars or abutments 16 and 17, respectively, which are secured to the nut. (See Fig. 3, which is a plan view of the lower slide.) Upon the ends of the shaft 11 there are keyed two arms 18 and 19, respectively, to which are hinged rods 20, connected at their lower ends to a stirrup or crank 22, carrying the table 21. The length of the rods 20 can be adjusted by nuts 23, engaging right and left hand threads in accordance with the depth of the pastry or confectionery to be molded.

When the lever 10 is pressed downward, the nut, and consequently also the pressure-plate 2, attached to the screw 3, is depressed through the medium of the wedge slides 13 and 14, the table 21 being at the same time raised. If now the hand-lever 6 be turned, the pressure-plate 2 is depressed for delivering the dough, after which the lever is turned back to its original position, during which operation the pawl 7 slides over the teeth 5, held from rotation by the spring-detent 24. On reversing the movement of the lever 10 the slides 13 and 14 raise the nut, with the pressure-plate, to a slight extent, so as to generate a vacuum, the table 21 being at the same time lowered for enabling the tray, with the pastry or confectionery, to be removed and an empty tray placed thereon.

From the above description it will be obvious that the manipulation of the machine is a simple one and that it is effected in an extremely simple manner.

Having now particularly described and ascertained the nature of my said invention and in what manner the same is to be performed, I declare that what I claim is—

1. In a machine for molding pastry and confectionery, a container, a plunger or pressure-plate moving up and down within said container, and a table below said container in combination with means acting simultaneously to positively depress the table and raise the plunger, and vice versa, substantially as described.

2. In a machine for molding pastry and confectionery, a container, a plunger or pressure-plate moving up and down within said container, and a wedge for raising and lowering said plunger.

3. In a machine for molding pastry and confectionery, a container, a plunger or pressure-plate moving up and down within said container, and wedges for positively raising said plunger.

4. In a machine for molding pastry and confectionery, a container, a plunger or pressure-plate moving up and down within said container, and a table below said container, in combination with wedges acting to raise and lower said plunger, and means in connection with said wedges for simultaneously lowering and raising the table.

5. In a machine for molding pastry and confectionery the combination of a table, a container, a plunger or pressure-plate fitting into said container, a screw connected to the plunger, an internally-screw-threaded bushing, means for inserting the plunger into the container, means for gradually extracting said plunger or pressure-plate from or inserting it into the container, with means such as wedges for simultaneously lowering the plunger and raising the molding-table and vice versa, substantially as described.

6. In a machine for molding confectionery and pastry the combination of a table, a container, a plunger or pressure-plate, a screw connected to the plunger, a hand-wheel having an internally-screw-threaded bushing with which the aforesaid screw engages and means such as a pair of wedges actuated by a rocking spindle for raising and lowering the bushing and plunger relatively with the container, substantially as hereinbefore described.

7. In a machine for molding confectionery and pastry the combination of a table, a container, a plunger or pressure-plate working within the container, a screw attached to the plunger and engaging the bushing of a hand-wheel, ratchet-teeth upon the said hand-wheel, a pawl engaging the said ratchet-teeth and actuated by a lever, wedges for reciprocating the hand-wheel and plunger, a shaft for actuating the wedges, and links connecting arms upon the said shaft to a crank in connection with the table so as to simultaneously operate both plunger and table, substantially as hereinbefore described.

8. In a machine for molding confectionery and pastry the combination of a table, a container, a plunger or pressure-plate working within the container, a screw attached to the plunger and engaging the bushing of a hand-wheel, ratchet-teeth upon the said hand-wheel, a pawl engaging the said ratchet-teeth and actuated by a lever, wedges for reciprocating the hand-wheel and plunger, a shaft for actuating the wedges, links connecting arms upon the said shaft to a crank in connection with the table so as to simultaneously operate both plunger and table, and means for adjusting the length of the rods, substantially as described.

In testimony whereof I have signed my name to this specification in the presence of two subscribing witnesses.

CHRISTIAN MÖRZINGER CABOS.

Witnesses:
   WENZEL SINKEYM,
   ALVESTO S. HOGUE.